US012365177B2

(12) United States Patent
Takahashi et al.

(10) Patent No.: US 12,365,177 B2
(45) Date of Patent: Jul. 22, 2025

(54) LIQUID EJECTION HEAD INSPECTION METHOD, LIQUID EJECTION HEAD INSPECTION APPARATUS, AND EJECTION ELEMENT SUBSTRATE

(71) Applicant: CANON KABUSHIKI KAISHA, Tokyo (JP)

(72) Inventors: Satoru Takahashi, Kanagawa (JP); Junichiro Iri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/229,799

(22) Filed: Aug. 3, 2023

(65) Prior Publication Data

US 2024/0042758 A1 Feb. 8, 2024

(30) Foreign Application Priority Data

Aug. 4, 2022 (JP) ................................ 2022-124639

(51) Int. Cl.
*B41J 2/045* (2006.01)
*B41J 2/14* (2006.01)

(52) U.S. Cl.
CPC ......... *B41J 2/04565* (2013.01); *B41J 2/0458* (2013.01); *B41J 2/14129* (2013.01)

(58) Field of Classification Search
CPC ... B41J 2/04565; B41J 2/0458; B41J 2/14129
See application file for complete search history.

(56) References Cited

FOREIGN PATENT DOCUMENTS

| | | | | |
|---|---|---|---|---|
| JP | 2011224874 A | * 11/2011 | ............... | B41J 2/01 |
| JP | 2018-153971 A | 10/2018 | | |

* cited by examiner

*Primary Examiner* — Geoffrey S Mruk
(74) *Attorney, Agent, or Firm* — Venable LLP

(57) ABSTRACT

Provided is a technique which can inspect liquid ejection energy without changing electric wiring on an ejection element substrate of a liquid ejection head or ejecting liquid from the liquid ejection head. A liquid ejection head as an ejection-energy inspection target includes an ejection element substrate having a substrate, a heat generation portion having an electrothermal converter on the substrate, a protective film covering the electrothermal converter, and an organic layer covering the electrothermal converter and the protective film. For this liquid ejection head, an electrical resistance value of the electrothermal converter is acquired as a first measurement result, and the film thickness of a film thickness measurement portion of the ejection element substrate where the protective film is exposed is acquired as a second measurement result. Further, information on ejection energy needed to eject liquid from the ejection port is obtained based on the first and second measurement results.

11 Claims, 7 Drawing Sheets

LIQUID EJECTION HEAD INSPECTION METHOD, LIQUID EJECTION HEAD INSPECTION APPARATUS, AND EJECTION ELEMENT SUBSTRATE

BACKGROUND OF THE INVENTION

Field of the Invention

The present disclosure relates to an inspection method and an inspection apparatus for a liquid ejection head that ejects liquid from ejection ports and also to an ejection element substrate.

Description of the Related Art

In a typically known ink ejection method for a print head mounted in an inkjet printing apparatus, electrothermal converters heat ink to eject droplets using the action of film boiling. A manufacturing process for such an inkjet print head needs to include a step for measuring the heat generation characteristics of the electrothermal converters and setting drive voltage to apply to the electrothermal converters.

As a method for setting ejection energy for liquid ejection, Japanese Patent Laid-Open No. 2011-224874 discloses a technique which prints inspection patterns while gradually changing at least one of the voltage value of drive voltage and the duration of time for applying the drive voltage and sets the ejection energy based on the inspection patterns thus printed.

Also, Japanese Patent Laid-Open No. 2018-153971 discloses a technique which, by utilizing the fact that a protective film protecting the electrothermal converters is sandwiched by films of different physical properties, estimates the film thickness of the protective film by measuring capacitance and calculates drive voltage based on the estimated film thickness and the electrical resistance of the electrothermal converters.

In order for the technique disclosed in Japanese Patent Laid-Open No. 2011-224874 to set the drive voltage in the manufacturing process, ink needs to be actually ejected. Thus, the manufacturing process needs to have a step for supplying ink to the ejection ports (nozzles) and a step for cleaning the ejection port surface after the ink ejection. By contrast, the technique disclosed in Japanese Patent Laid-Open No. 2018-153971 can find drive voltage needed to eject liquid without ink ejection. However, in order to be able to estimate the film thickness of the protective film through measurement of capacitance, measurement electrodes and dedicated wiring for capacitance measurement, which are not needed for actual ink ejection, need to be laid on the substrate.

SUMMARY OF THE INVENTION

The present disclosure aims to provide a technique which can inspect liquid ejection energy without having to change the electric wiring on an ejection element substrate or eject liquid.

In a first aspect of the present disclosure, there is provided an inspection method for inspecting a liquid ejection head including an ejection element substrate which has a substrate, a heat generation portion having an electrothermal converter provided on a first surface of the substrate, a protective film covering the electrothermal converter, and an organic layer covering the electrothermal converter and the protective film, the ejection element substrate being capable of ejecting liquid in a flow channel formed between the organic layer and the protective film through an ejection port formed in the organic layer by using heat generated at the heat generation portion, the inspection method comprising: acquiring, as a first measurement result, an electrical resistance value of the electrothermal converter, acquiring, as a second measurement result, a film thickness of the protective film at a film thickness measurement portion of the ejection element substrate where the protective film is exposed; and obtaining information on ejection energy needed to eject liquid through the ejection port, based on the first measurement result and the second measurement result.

In a second aspect of the present disclosure, there is provided an inspection apparatus for inspecting a liquid ejection head including an ejection element substrate which has a substrate, a heat generation portion having an electrothermal converter provided on a first surface of the substrate, a protective film covering the electrothermal converter, and an organic layer covering the electrothermal converter and the protective film, the ejection element substrate being capable of ejecting liquid in a flow channel formed between the organic layer and the protective film through an ejection port formed in the organic layer by using heat generated at the heat generation portion, the inspection apparatus comprising: a resistance value measurement unit configured to acquire, as a first measurement result, an electrical resistance value of the electrothermal converter; a film thickness measurement unit configured to acquire, as a second measurement result, a film thickness of the protective film at a film thickness measurement portion of the ejection element substrate where the protective film is exposed; and an obtainment unit configured to obtain information on ejection energy needed to eject liquid through the ejection port, based on the first measurement result and the second measurement result.

In a third aspect of the present disclosure, there is provided an ejection element substrate comprising: a substrate; a heat generation portion having an electrothermal converter provided on a first surface of the substrate; a protective film covering the electrothermal converter; and an organic layer covering the electrothermal converter and the protective film, wherein the ejection element substrate is capable of ejecting liquid in a flow channel formed between the organic layer and the protective film through an ejection port formed in the organic layer by using heat generated at the heat generation portion, and the ejection element substrate further comprises a film thickness measurement portion where the organic layer is removed to expose the protective film.

Further features of the present invention will become apparent from the following description of exemplary embodiments with reference to the attached drawings.

DESCRIPTION OF THE EMBODIMENTS

Embodiments of the present disclosure are described in detail below with reference to the drawings attached hereto. Note that the embodiments below are not intended to limit the present invention according to the scope of claims, and not all the combinations of features described in the present embodiments are necessarily essential to the present invention. Also, although an inkjet print head mounted in an inkjet printing apparatus as a liquid ejection apparatus is used as an example of a liquid ejection head described in the embodiments, the liquid ejection head of the present disclosure is not limited to an inkjet print head used for image formation and can also be applied to an industrial liquid ejection head used to manufacture a product by ejecting liquid other than ink.

First Embodiment

Figure 1:
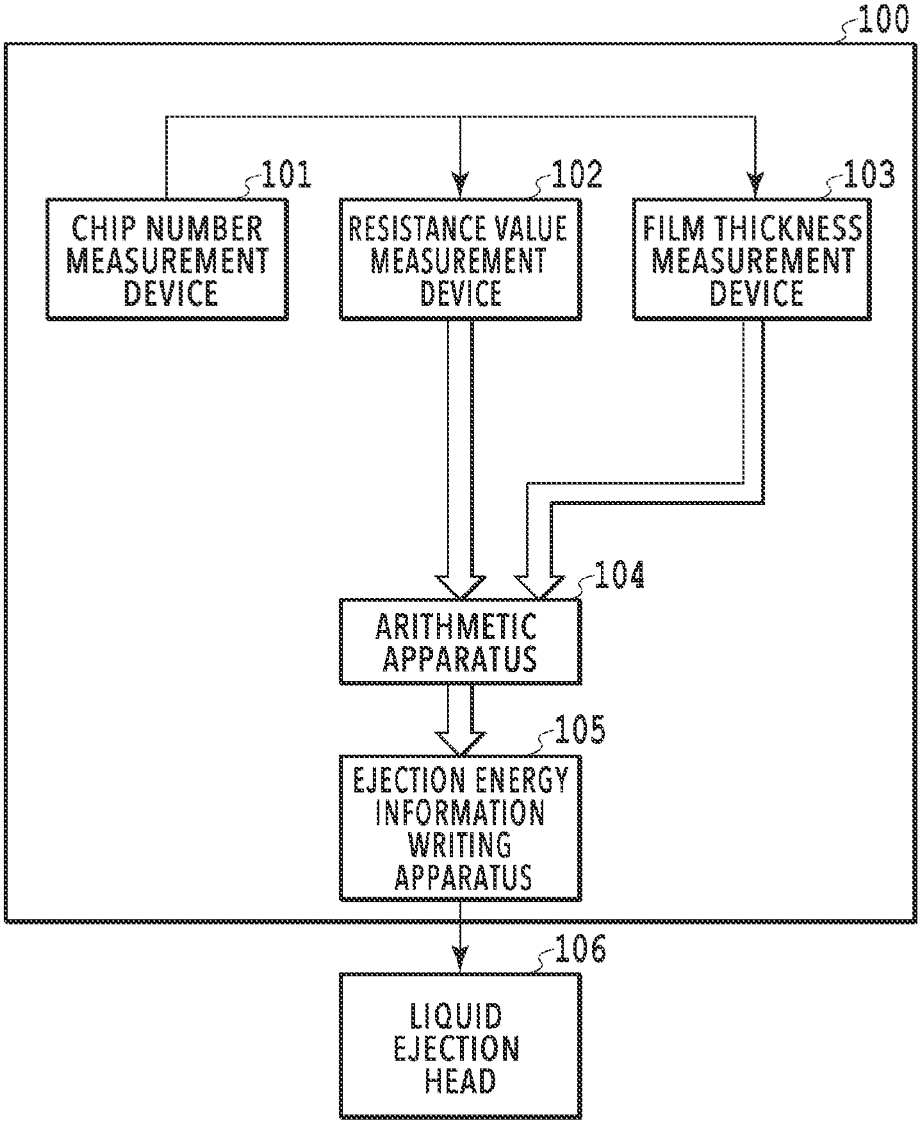
FIG. 1 is a block diagram illustrating the configuration of a liquid ejection head inspection apparatus.

FIG. 1 is a block diagram illustrating the configuration of an inspection apparatus 100 that inspects the ejection energy of a liquid ejection head of a first embodiment of the present disclosure and of a second embodiment of the present disclosure (to be described later). As illustrated in FIG. 1, the inspection apparatus 100 of the present embodiment is configured to include a chip number measurement device 101, a film thickness measurement device 103, a resistance value measurement device 102, an arithmetic apparatus 104, an ejection energy information writing apparatus 105, and the like. The chip number measurement device (position obtainment unit) 101 obtains the position of an ejection element substrate 301 on a wafer 401, the ejection element substrate 301 being one of a plurality of ejection element substrates 301 formed by cutting and separating of the wafer 401 illustrated in FIG. 3. The obtainment of the position on the wafer 401 is done by the chip number measurement device 101 reading the chip number (substrate identification number) engraved in the surface of the ejection element substrate 301.

The film thickness measurement device (film thickness measurement unit) 103 is a measurement device that optically measures the thickness of a protective film forming the surface of the wafer 401, and a spectroscopic film thickness measurement device is used in the present embodiment. Based on the substrate identification number measured by the chip number measurement device 101, the film thickness measurement device 103 selects film thickness measurement areas to measure, from a plurality of film thickness measurement areas (to be described later) formed on the ejection element substrate 301. A description will be given later as to the film thickness measurement areas and the protective film. The resistance value measurement device (the resistance value measurement unit) 102 is a measurement device that measures the electrical resistance value of an electrothermal converter (a heat generation portion) (to be described later) formed on the electrothermal conversion substrate (also referred to as an ejection element substrate) 301.

The arithmetic device (obtainment unit) 104 calculates information on the electric energy (ejection energy) needed to eject liquid, based on resistance value data indicating the electrical resistance value measured by the resistance value measurement device 102 and film thickness data indicating the film thickness value measured by the film thickness measurement device 103. For this arithmetic apparatus 104, for example, a publicly known arithmetic apparatus in the form of a computer, such as a CPU, a ROM, and a RAM, can be used. The energy information writing apparatus 105 is an apparatus that registers a calculation result on the ejection energy information calculated by the arithmetic apparatus 104 into a storage unit provided in a liquid ejection head 106.

Figure 2:
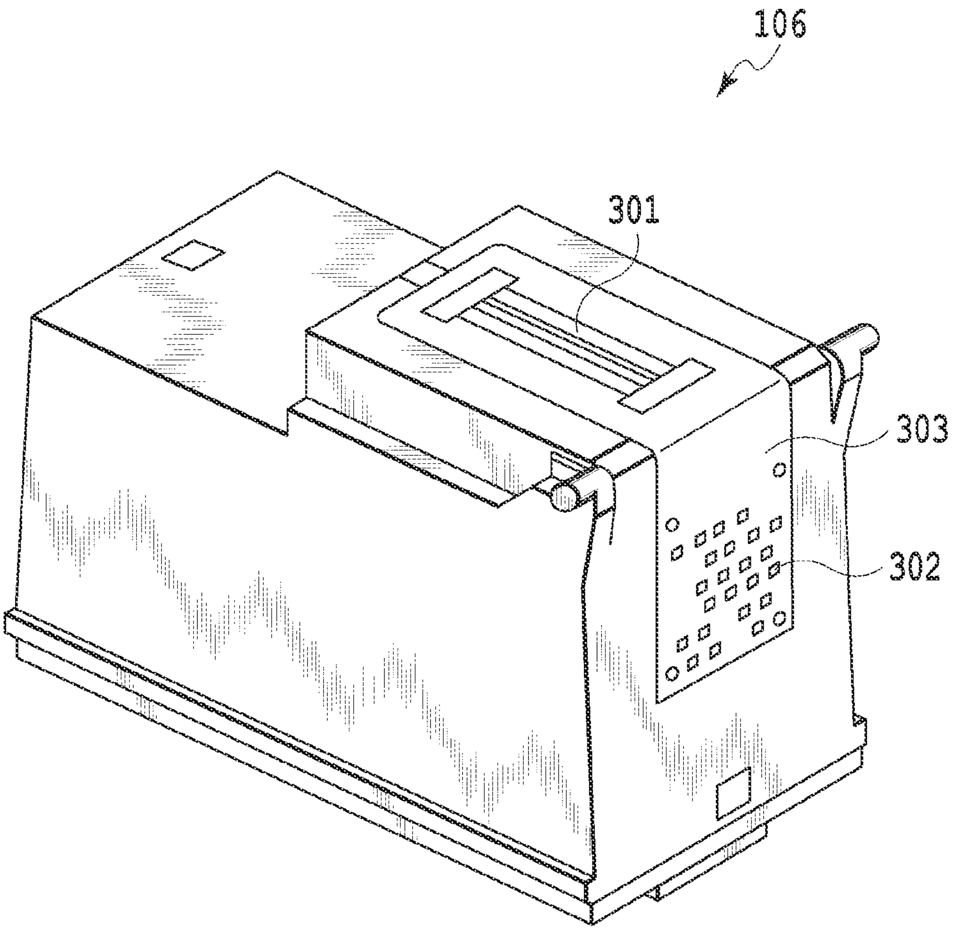
FIG. 2 is a perspective view illustrating the configuration of a liquid ejection head.

FIG. 2 is a perspective view illustrating the liquid ejection head 106 that can be inspected by the inspection apparatus described above. The liquid ejection head 106 is a thermal liquid ejection head that converts electric energy into heat to heat up liquid and generate bubbles and thereby allows the liquid to be ejected from ejection ports by the pressure of the bubble generation. The liquid ejection head of the present embodiment is a print head used for an inkjet printing apparatus that performs printing by ejecting ink as liquid. This liquid ejection head 106 has an ejection element substrate 301 including ejection ports from which to eject liquid, electrothermal converters (to be described later) that generate heat for heating the liquid and ejecting the liquid from the ejection ports, and the like. Note that the liquid ejection head 106 illustrated in FIG. 2 is in the form of a cartridge including, in a housing that supports the ejection element substrate 301, a liquid retaining unit (an ink tank) that retains liquid to be supplied to the ejection element substrate 301.

A tape-shaped electric wiring member 303 is electrically connected to the ejection element substrate 301, and the electric wiring member 303 is provided with connection terminals 302 for supplying electric signals, power, and the like for liquid ejection. The resistance value of a heat-generating resistor (electrothermal converter) 205 (FIG. 5B) (to be described later) can be obtained by measurement of the value of current flowing through the heat-generating resistor 205 with predetermined voltage being given to the connection terminals 302 to apply voltage to the ejection element substrate 301 via the electric wiring member 303.

Figure 3:
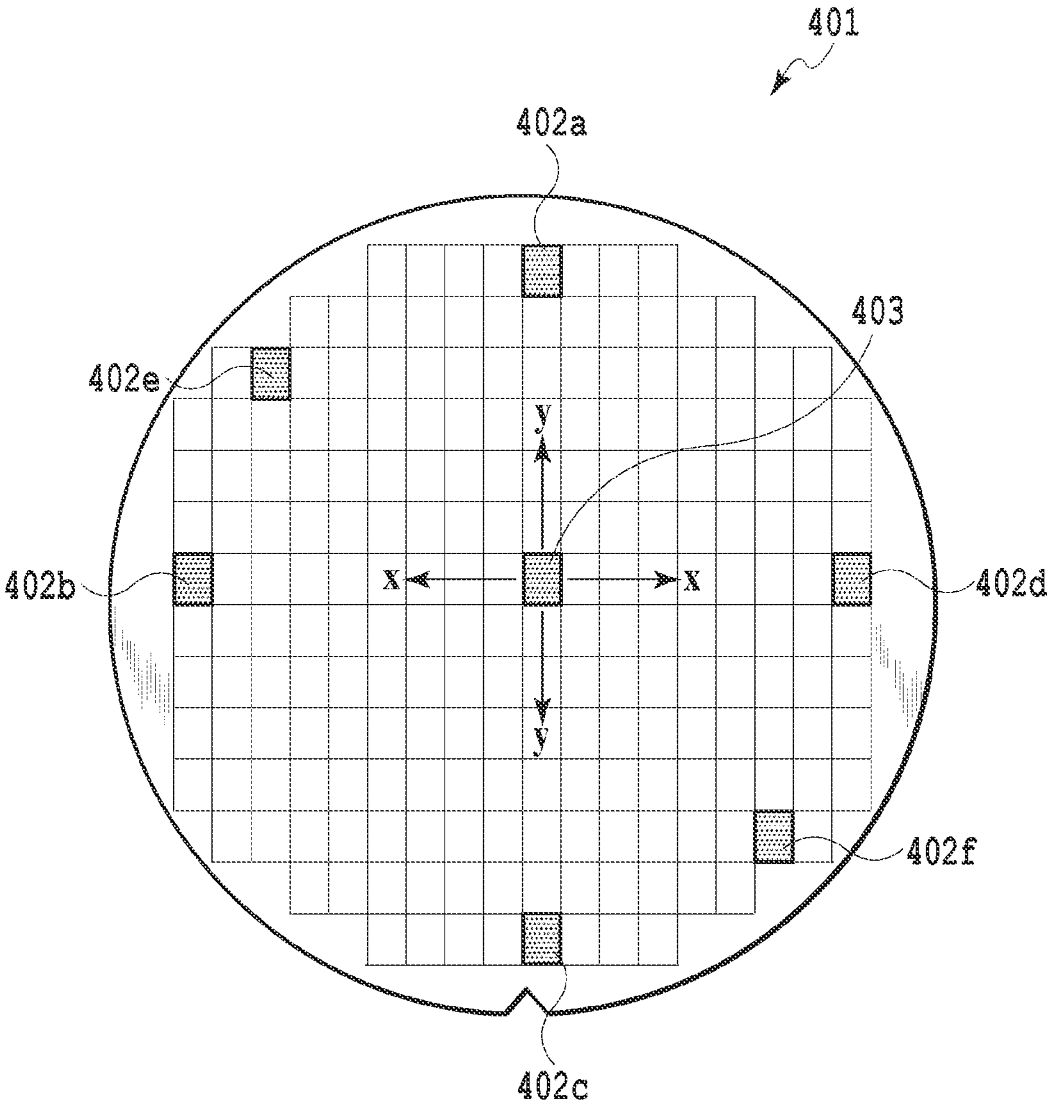
FIG. 3 is a diagram illustrating a wafer for manufacturing ejection element substrates for liquid ejection heads.

FIG. 3 is a diagram illustrating the wafer 401 for manufacturing the ejection element substrates 301 of the liquid ejection heads 106. The ejection element substrate 301 provided at the liquid ejection head 106 is formed by being cut and separated from the wafer 401 having a predetermined stacking structure. Each of the rectangular regions depicted on the wafer 401 illustrated in FIG. 3 is a substrate formation region corresponding to one ejection element substrate 301. Each substrate formation region is cut and separated from the wafer 401 to manufacture the ejection element substrate 301 to be provided to the liquid ejection head. Note that in FIG. 3, reference numerals 402*a* to 402*f* denote substrate formation regions set at six positions on the wafer 401. Note that in a manufacturing process before the ejection element substrates 301 are cut and separated from the wafer 401, the substrate formation regions are given identification numbers corresponding to the positions on the wafer 401.

The wafer 401 is formed of a plurality of layers for forming the ejection element substrates 301, and heat generation portions where heat is generated are covered by an insulating protective film. This protective film tends to be thicker at a center portion than at an outer peripheral portion because of its manufacturing method. Specifically, the protective film in the substrate formation regions located at the positions 402*a* to 402*d* in FIG. 3 tends to be thinner than that in a substrate formation region 403 at the center position of the wafer 401. Thus, the ejection element substrates 301 formed by formation regions located at 402*a* and 402*c* have a varying film thickness in the long-side direction, and the ejection element substrates 301 formed by rectangular regions located at 402*b* and 402*d* have a varying film thickness in the short-side direction.

Figure 4:
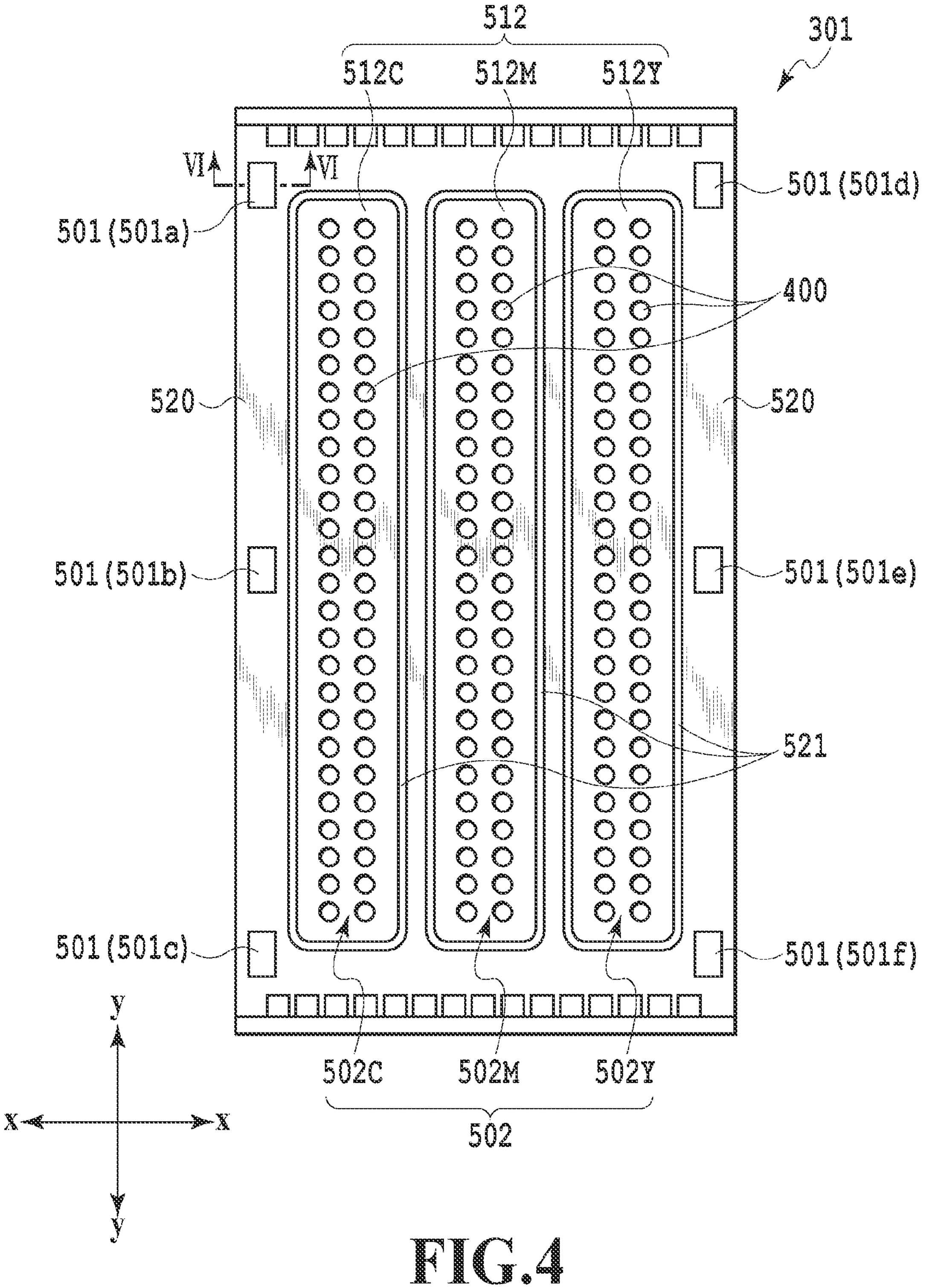
FIG. 4 is an enlarged plan view illustrating an ejection element substrate of a first embodiment.

FIG. 4 is an enlarged plan view of the ejection element substrate 301 in the first embodiment. The ejection element substrate 301 illustrated in FIG. 4 is formed by being cut and separated from the wafer 401 illustrated in FIG. 3 and corresponds to one of the plurality of substrate formation regions illustrated in FIG. 3. The ejection element substrate 301 illustrated in FIG. 4 has a plurality of ejection ports 400 formed to eject liquid. The ejection element substrate 301 of the present example is capable of ejecting three types of ink as the liquid to eject, and ejection port groups 502 (502C, 502M, 502Y) each formed by a plurality of ejection ports 400 are formed to correspond to the respective colors of ink to eject. Note that the ejection port group 502C is formed by a plurality of ejection ports 400 that eject a cyan ink, the ejection port group 502M is formed by a plurality of ejection ports 400 that eject a magenta ink, and the ejection port group 502Y is formed by a plurality of ejection ports 400 that eject a yellow ink. The ejection port groups 502C, 502M, 502Y are formed in ejection port formation regions 512C, 512M, 512Y surrounded by rectangular grooves 521 formed in the ejection element substrate 301, respectively. Also, film thickness monitor portions 501 are provided in an outer periphery region 520 located outside the ejection port formation regions 512C, 512M, 512Y.

The film thickness monitor portions 501 are portions where the above-described film thickness measurement device 103 measures the thickness of the protective film covering the electrothermal converters of the ejection element substrate 301, and are portions where an organic layer formed as the outermost surface of the ejection element substrate 301 is removed. In the present embodiment, film thickness monitor portions 501*a* to 501*f* are formed at six positions in an outer peripheral region 520 of the ejection element substrate 301. The film thickness monitor portions 501*a* to 501*c* are formed at three positions along one of the long sides of the rectangular ejection element substrate 301, and the film thickness monitor portions 501*d* to 501*f* are formed at three positions along the other one of the long sides of the ejection element substrate 301. Note that the x-direction and y-direction of the ejection element substrate 301 coincide with the x-direction and y-direction of the wafer 401 in FIG. 3.

Figure 5A:
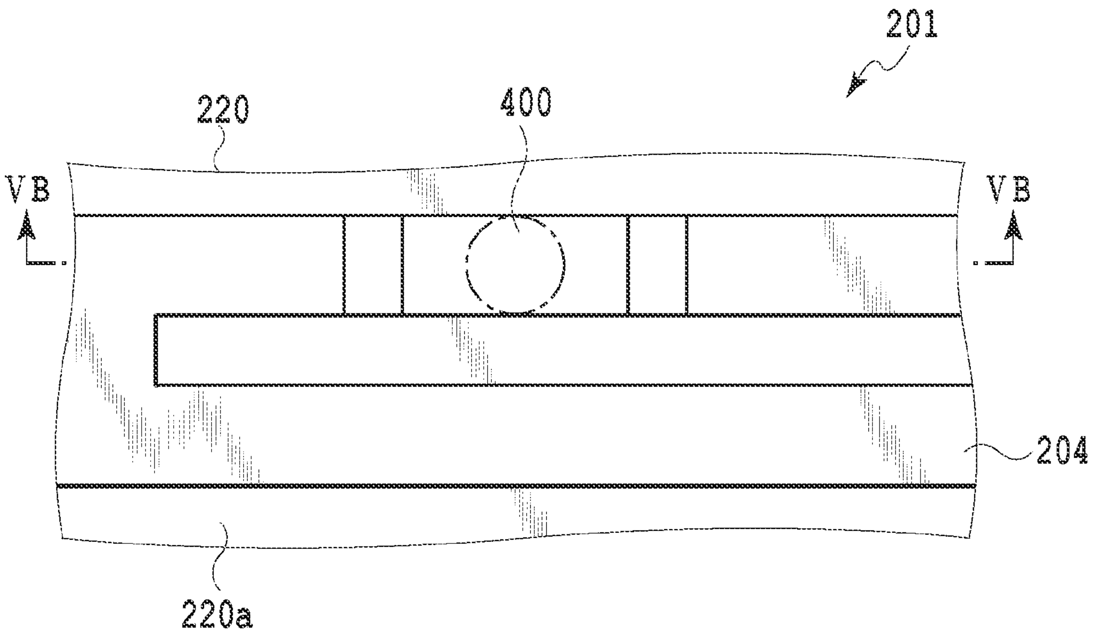
FIGS. 5A and 5B are diagrams illustrating an example shape of an electrothermal converter provided at the ejection element substrate illustrated in FIG. 4.
Figure 5B:
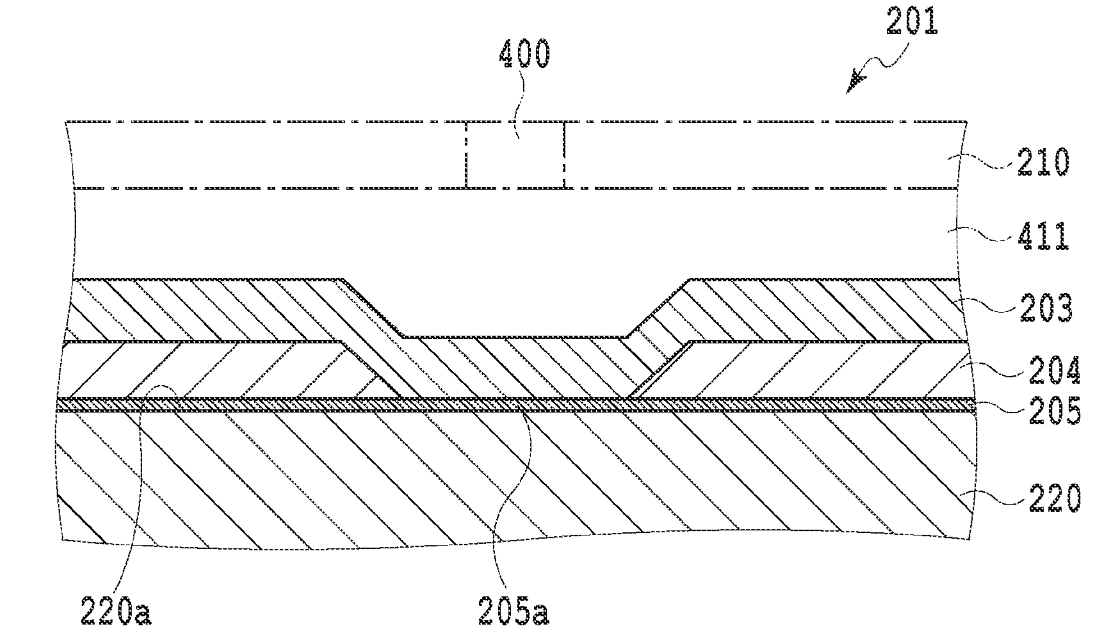

FIGS. 5A and 5B are diagrams illustrating an example shape of an electrothermal converter 201 provided at the ejection element substrate 301 illustrated in FIG. 4, FIG. 5A being a plan view and FIG. 5B being a sectional view taken along the line VB-VB in FIG. 5A.

The electrothermal converter 201 is structured such that a heat-generating resistor 205 provided on a first surface 220*a* of a substrate 220 formed of a silicon substrate or the like, a wiring portion 204 electrically connected to the heat-generating resistor 205, and a protective film 203 covering the heat-generating resistor 205 and the wiring portion 204 are stacked sequentially. The heat-generating resistor 205 has a region 205*a* which is in direct contact with the protective film 203 at a notch portion formed in part of the wiring portion 204. This region 205*a* of the heat-generating resistor 205 which is in direct contact with the protective film 203 serves as a heat generation portion that generates heat for heating liquid. The protective film 203 of the electrothermal converter 201 is covered by an organic layer 210 forming the outermost surface of the ejection element substrate 301. A flow channel 411 supplied with liquid is formed between the organic layer 210 and the protective film 203, and an ejection port 400 is formed in the organic layer 210 to eject liquid supplied from the flow channel. The ejection port 400 is formed at a position facing the heat generation portion 205*a* of the heat-generating resistor 205.

To cause liquid supplied into the flow channel 411 to be ejected from the ejection port 400, the heat-generating resistor 205 is energized via the wiring portion 204 so that the heat generation portion 205*a* raises the temperature of the surface of the protective film 203. As a result, an air bubble is generated by film boiling inside the liquid (ink) in contact with the surface of the protective film 203, and the pressure produced by the bubble generation causes the liquid to be ejected from the ejection port 400.

Electric energy needed to eject liquid (ejection energy) greatly depends on the resistance value of the heat-generating resistor 205 and the film thickness of the protective film 203. In other words, with a constant voltage supplied from the printing apparatus, the larger the resistance value of the heat-generating resistor 205, the smaller the current value. Thus, in a case where the resistance value of the heat-generating resistor 205 is large, it is necessary for the printing apparatus to either apply voltage to the heat-generating resistor 205 for a longer duration of time or increase the voltage applied to the heat-generating resistor 205.

Also, in a case where the protective film 203 is thick, the distance from the heat-generating resistor 205 to the ink to be ejected is long, which means that larger ejection energy is needed in order to eject liquid. Strictly speaking, other fluctuations which may occur in the manufacturing process also affect fluctuations in the ejection energy, but the influences by such fluctuations are negligible compared to the resistance value of the heat-generating resistor 205 and the thickness of the protective film 203. Thus, information on ejection energy for generating heat needed to eject liquid can be found by measurement of the resistance value of the heat-generating resistor and the thickness of the protective film 203. In the present embodiment, in order to measure the thickness of the protective film 203 with high accuracy, the film thickness measurement device 103 of the inspection apparatus 100 measures the film thickness of the protective film 203 at the film thickness monitor portions (film thickness measurement portions) 501 illustrated in FIG. 4.

Figure 6:
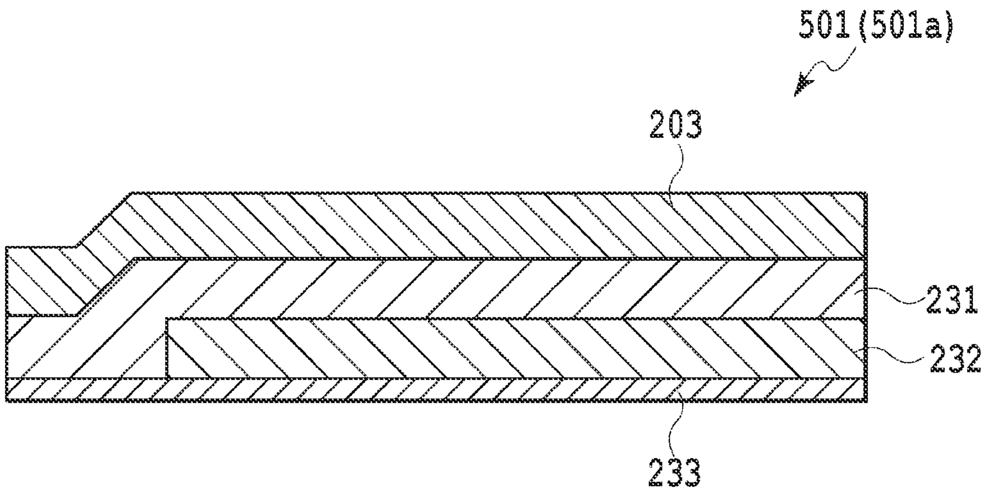
FIG. 6 is a diagram illustrating a sectional structure of a film thickness monitor portion illustrated in FIG. 4.

FIG. 6 is a diagram illustrating a cross sectional structure of the film thickness monitor portion 501 illustrated in FIG. 4, and here, a section taken along the line VI-VI of the film thickness monitor portion 501*a* illustrated in FIG. 4 is illustrated as an example. As illustrated in FIG. 6, the film thickness monitor portion 501 is such that heat storage layers 231 to 233 are formed on a substrate (not illustrated) such as a silicon substrate, and the surface of the heat storage layer 231 is covered by the protective film 203. This protective film 203 is the same as the protective film 203 illustrated in FIG. 5. However, the protective film 203 at the film thickness monitor portion 501 is not covered by the organic layer 210 forming the ejection port 400 and the flow channel 411 and is exposed to the front surface side of the ejection element substrate 301. This enables the film thickness measurement device 103 to measure the film thickness of the protective film 203 with high accuracy.

It is desirable that the thickness of the protective film 203 to be measured for estimation of ink ejection energy be measured immediately under the ejection port 400. However, the spot diameter of a spectroscopic film thickness gauge as a film thickness measurement device is larger than the ink ejection port, and thus, measurement using the ejection port 400 is difficult. For this reason, the monitor portions for performing film thickness measurement need to be at positions where the electrothermal converter 201, the wiring portion 204, the flow channel 411 formed for liquid ejection, and the like are not affected and where the protective film 203 appears as the uppermost portion. Thus, in the ejection element substrate 301 of the present embodiment, the film thickness monitor portions 501 are formed in the outer peripheral region 520 where there are no electrothermal converter 201 or wiring portion 204. The protective film 203 is exposed and measured at these film thickness monitor portions 501. The region of the organic layer 210 removed to form the film thickness monitor portion 501 needs to be equal to or larger than the spot diameter of the spectral film thickness measurement device. Thus, in the present embodiment, the film thickness monitor portion 501 is a rectangle whose short side is approximately 15 μm.

In the ejection element substrate 301 of the liquid ejection head 106 configured as described above, the ejection energy for ejecting liquid from the ejection port 400 can be set using the inspection apparatus 100 illustrated in FIG. 1.

First, the inspection apparatus 100 determines from which position on the wafer 401 illustrated in FIG. 3 the ejection element substrate 301 provided at the liquid ejection head 106 has been cut and separated. This determination is made by the chip number measurement device 101 obtaining the identification number engraved in the ejection element substrate 301. As described earlier, in the manufacturing process before the ejection element substrates 301 are cut and separated from the wafer 401, the substrate formation regions corresponding to the ejection element substrates 301 have respective identification numbers engraved therein, the identification numbers corresponding to the positions of the substrate formation regions on the wafer 401. Based on the identification number obtained by the chip number measurement device 101, the film thickness measurement device 103 selects film thickness monitor portions to use for film thickness measurement from the six film thickness monitor portions 501*a* to 501*f* formed at the ejection element substrate 301. In the present embodiment, two of the film thickness monitor portions are selected as film thickness measurement targets: a film thickness monitor portion located at a portion with the smallest film thickness (a first film thickness measurement portion) and a film thickness monitor portion located at a portion with the largest film thickness (a second film thickness measurement portion) at the ejection element substrate 301.

For example, the ejection element substrate 301 formed by cutting and separating the substrate formation region 402*a* of the wafer 401 illustrated in FIG. 3 has a film thickness varying in the long side direction (the y-direction). Thus, from the six film thickness monitor portions 501*a* to 501*f* formed at the ejection element substrate 301, the film thickness monitor portion 501*a* with the smallest film thickness and the film thickness monitor portion 501*c* with the largest film thickness are selected as measurement targets and are measured in their respective film thicknesses. Then, the average value between the measurement values for the film thickness monitor portion 501*a* and the film thickness monitor portion 501*c* is set as film thickness data (a second measurement result). Film thickness data with small error can thus be obtained. Film thickness data for the substrate formation region 402*c* is obtained similarly.

Meanwhile, the ejection element substrates 301 formed by cutting and separating the substrate formation regions 402*b*, 402*d* illustrated in FIG. 3 each have a film thickness varying in the short side direction (the x-direction). Thus, the film thickness monitor portions 501*b* and 501*e* illustrated in FIG. 4 are measured in their film thicknesses, and the average value between their measurement values is set as film thickness data (a second measurement result). Meanwhile, the ejection element substrates 301 formed by cutting and separating the substrate formation regions 402*e*, 402*f* illustrated in FIG. 3 each have a film thickness varying in a diagonal direction of the ejection element substrate 301. Thus, for the substrate formation regions 402*e*, 402*f*, the film thickness monitor portions 501*a* and 501*f* that are located at diagonal positions are measured in their film thicknesses, and the average value between their measurement values is set as film thickness data (a second measurement result). Film thickness data can be obtained with high accuracy by such film thickness measurement using different film thickness monitor portions based on the film-thickness varying tendency of the ejection element substrate 301.

The film thickness data obtained as described above and the resistance value of the heat generation portion 205*a* (a first measurement result) are inputted to the arithmetic apparatus 104. Based on the film thickness data and the resistance value data inputted thereto, the arithmetic apparatus 104 calculates information on ejection energy needed to eject liquid and sends the calculated ejection energy information to the ejection energy information writing apparatus 105. The ejection energy information writing apparatus 105 writes the ejection energy information calculated by the arithmetic apparatus 104 into non-volatile memory provided in the liquid ejection head 106 to be inspected. The ejection energy information written into the non-volatile memory serves as individual information on the liquid ejection head 106. Once the liquid ejection head 106 is mounted in a liquid ejection apparatus (an inkjet printing apparatus), the liquid ejection apparatus reads ejection energy information written into the non-volatile memory in the liquid ejection head 106. Then, in a case where the ejection energy thus read is smaller than a currently set ejection energy, the liquid ejection apparatus controls at least one of the drive voltage and the drive voltage application duration to generate the ejection energy read from the liquid ejection head 106. As a result, droplets can be ejected properly from the liquid ejection head 106.

As thus described, by directly measuring the resistance value of the electrothermal converter and the thickness of the protective film, the present embodiment can measure accurate ejection energy in a short period of time without having to actually eject liquid. In other words, because actual liquid ejection is not needed, a step of supplying liquid to the ejection ports and a step of cleaning the nozzle surface after the liquid ejection are unnecessary, which makes it possible to measure the ejection energy in a short period of time. Also, because the manufacturing process for the liquid ejection head is simplified, the facility and apparatus for manufacturing the liquid ejection head can be small in size. Further, because the ejection element substrate 301 in the present embodiment does not need dedicated wiring and measurement electrodes for film thickness measurement, costs for manufacturing the ejection element substrate 301 are not increased.

Second Embodiment

Next, a second embodiment of the present invention is described with reference to FIGS. 7A and 7B. In the first embodiment described above, the film thickness monitor portions 501 are formed in the outer peripheral region 520 of the ejection element substrate 301, whereas in the second embodiment, film thickness monitor portions 601 (601*a* to 601*d*) are formed inside ejection port formation regions 612 (612C and 612Y).

Figure 7A:
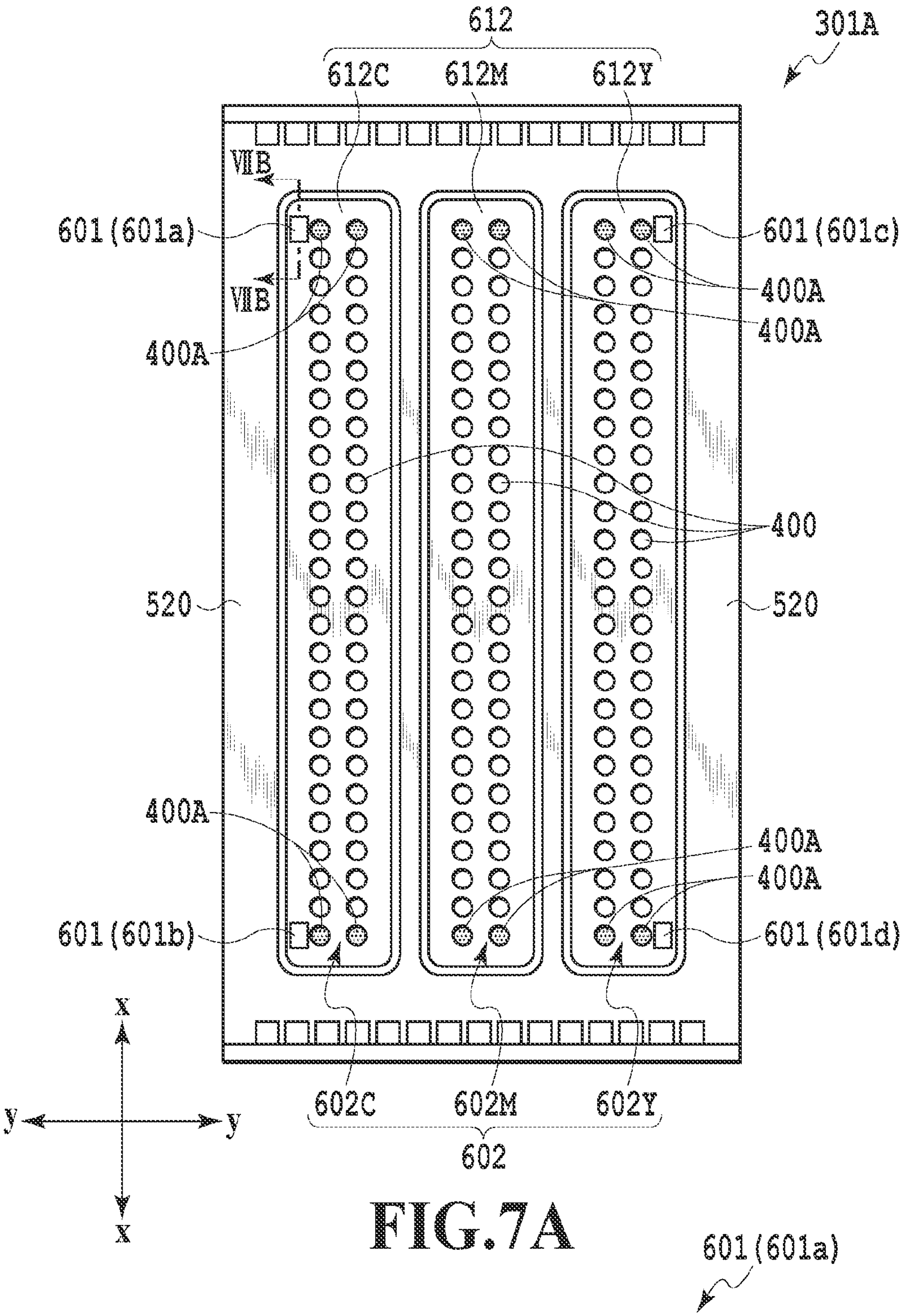
FIGS. 7A and 7B are diagrams illustrating an ejection element substrate of a second embodiment.
Figure 7B:
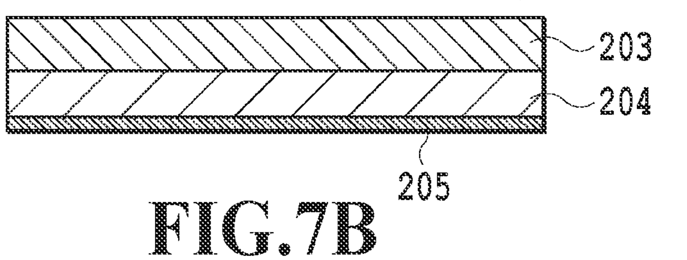

FIGS. 7A and 7B are diagrams illustrating an ejection element substrate 301A in the second embodiment, FIG. 7A being a plan view and FIG. 7B being a sectional view taken along the line VIIB-VIIB in FIG. 7A.

The ejection element substrate 301A of the present embodiment illustrated in FIG. 7 has a layer structure similar to that of the ejection element substrate in the first embodiment, except that the ejection element substrate 301A of the present embodiment is provided with ejection ports 400A at the end portions of ejection port groups 602C, 602M, and 602Y, the ejection ports 400A not being used for liquid ejection (and therefore hereinafter referred to as dummy ejection ports 400A) while the ejection element substrate 301A is mounted and used in the liquid ejection apparatus. Although the dummy ejection ports 400A are not used for ejection operation, portions in the ejection element substrate 301A that correspond to the dummy ejection ports 400A have the same layer structure as the ejection ports 400 actually used for ejection.

In such an ejection element substrate 301A including the dummy ejection ports 400A, the film thickness monitor portions 601 (601*a* to 601*d*) are disposed in the ejection port formation regions of the ejection element substrate 301A, at positions close to the dummy ejection ports 400A. Note that the film thickness monitor portions 601 need to be disposed at positions not affecting, e.g., the other ejection ports and the flow channel that are used for liquid ejection. Note that, as illustrated in FIG. 7B, the film thickness monitor portions 601 have the heat-generating resistor 205, the wiring portion 204, and the protective film 203 sequentially stacked, having a layer structure similar to that at a portion facing the dummy ejection port 400A. Note, however, that the organic layer 210 is not formed at the film thickness monitor portions 601, and thus the film thickness monitor portions 601 are regions where the protective film 203 is exposed. For these film thickness monitor portions 601 (601*a* to 601*d*), the film thickness measurement device 103 obtains film thickness data on the protective film 203 in a manner similar to the first embodiment. Further, the resistance value measurement device 102 of the inspection apparatus 100 obtains resistance value data on the heat generation portion 205*a*, and ejection energy needed to eject liquid is calculated based on the resistance value data and the film thickness data.

As thus described, according to the present embodiment, the film thickness monitor portions 601 are set at portions having the same layer structure as the layer structure at the positions facing the ejection ports 400 and the dummy ejection ports 400A, and the film thickness of the protective film 203 is measured by the inspection apparatus 100 formed of a spectroscopic film thickness measurement device. Thus, the film thickness of the protective film 203 that closely approximates the true value can be expected to be obtained. Further, because the film thickness monitor portions 601 are disposed at positions close to the dummy ejection ports 400A not used for ejection, the formation of the film thickness monitor portions 601 does not affect the ejection ports 400 that actually eject liquid.

Other Embodiments

Although the film thickness monitor portions formed in the above embodiments are rectangular as an example, the film thickness monitor portions may be in a shape other than a rectangle. For example, the film thickness monitor portions may be a square whose sides are each approximately 15 μm or a circle whose diameter is approximately 15 μm.

The present disclosure can inspect liquid ejection energy without having to change the electric wiring on the ejection element substrate or to eject liquid.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124639, filed Aug. 4, 2022, which is hereby incorporated by reference herein in its entirety.

What is claimed is:

1. An inspection method for inspecting a liquid ejection head including an ejection element substrate which has a substrate, a heat generation portion having an electrothermal converter provided on a first surface of the substrate, a protective film covering the electrothermal converter, and an organic layer covering the electrothermal converter and the protective film, the ejection element substrate being capable of ejecting liquid in a flow channel formed between the organic layer and the protective film through an ejection port formed in the organic layer by using heat generated at the heat generation portion, the inspection method comprising:

acquiring, as a first measurement result, an electrical resistance value of the electrothermal converter;

acquiring, as a second measurement result, a film thickness of the protective film at a film thickness measurement portion of the ejection element substrate where the protective film is exposed; and obtaining information on ejection energy needed to eject liquid through the ejection port based on the first measurement result and the second measurement result.

2. The inspection method according to claim 1, wherein the film thickness measurement portion is formed on a region of the ejection element substrate where the organic layer is not formed.

3. The inspection method according to claim 1, wherein the film thickness measurement portion is formed in an outer periphery portion located outside an ejection port formation region of the ejection element substrate where an ejection port group formed by a plurality of the ejection ports is formed.

4. The inspection method according to claim 1, wherein the film thickness measurement portion is formed inside an ejection port formation region of the ejection element substrate where an ejection port group formed by a plurality of the ejection ports is formed.

5. The inspection method according to claim 4, wherein the ejection port located at an end portion of the ejection port group is a dummy ejection port from which no ejection is performed, and the film thickness measurement portion is disposed at a position close to the dummy ejection port.

6. The inspection method according to claim 1, wherein the film thickness measurement portion is formed at a plurality of different positions on the ejection element substrate.

7. The inspection method according to claim 6, wherein the ejection element substrate is formed by cutting and separating a board formation region from a wafer having the substrate, the heat generation portion, and the protective film, the board formation region being one of a plurality of board formation regions set on the wafer, and the protective film on the wafer has a film-thickness varying tendency such that a film thickness decreases from a center position to an end portion of the wafer.

8. The inspection method according to claim 7, wherein the second measurement result is acquired based on the film thickness of the protective film at a first film thickness measurement portion and the film thickness of the protective film at a second film thickness measurement portion where the thickness of the protective film is larger than that at the first thickness measurement portion, the first and second film thickness measurement portions being selected from a plurality of the film thickness measurement portions according to the film-thickness varying tendency of the protective film.

9. The inspection method according to claim 8, wherein an average value between the film thickness of the protective film at the first film thickness measurement portion and the film thickness of the protective film at the second film thickness measurement portion is acquired as the second measurement result.

10. An inspection apparatus for inspecting a liquid ejection head including an ejection element substrate which has a substrate, a heat generation portion having an electrothermal converter provided on a first surface of the substrate, a protective film covering the electrothermal converter, and an organic layer covering the electrothermal converter and the protective film, the ejection element substrate being capable of ejecting liquid in a flow channel formed between the organic layer and the protective film through an ejection port formed in the organic layer by using heat generated at the heat generation portion, the inspection apparatus comprising:

a resistance value measurement unit configured to acquire, as a first measurement result, an electrical resistance value of the electrothermal converter;

a film thickness measurement unit configured to acquire, as a second measurement result, a film thickness of the protective film at a film thickness measurement portion of the ejection element substrate where the protective film is exposed; and an obtainment unit configured to obtain information on ejection energy needed to eject liquid through the ejection port based on the first measurement result and the second measurement result.

11. The inspection apparatus according to claim 10, wherein the film thickness measurement portion is provided at a plurality of different positions on the ejection element substrate, the ejection element substrate is formed by cutting and separating a board formation region from a wafer having the substrate, the heat generation portion, and the protective film, the board formation region being one of a plurality of board formation regions set on the wafer, the inspection apparatus further comprises a position obtainment unit configured to obtain a position on the wafer at which the ejection element substrate was located before being cut and separated from the wafer, and the film thickness measurement unit selects the film thickness measurement portion to use for measuring the film thickness of the protective film from a plurality of the film thickness measurement portions based on the position obtained by the position obtainment unit and measures the film thickness of the protective film at the film thickness measurement portion selected.

* * * * *